(No Model.)
C. E. BURROWS & F. E. JONES.
MOTOR.
No. 426,432. Patented Apr. 29, 1890.
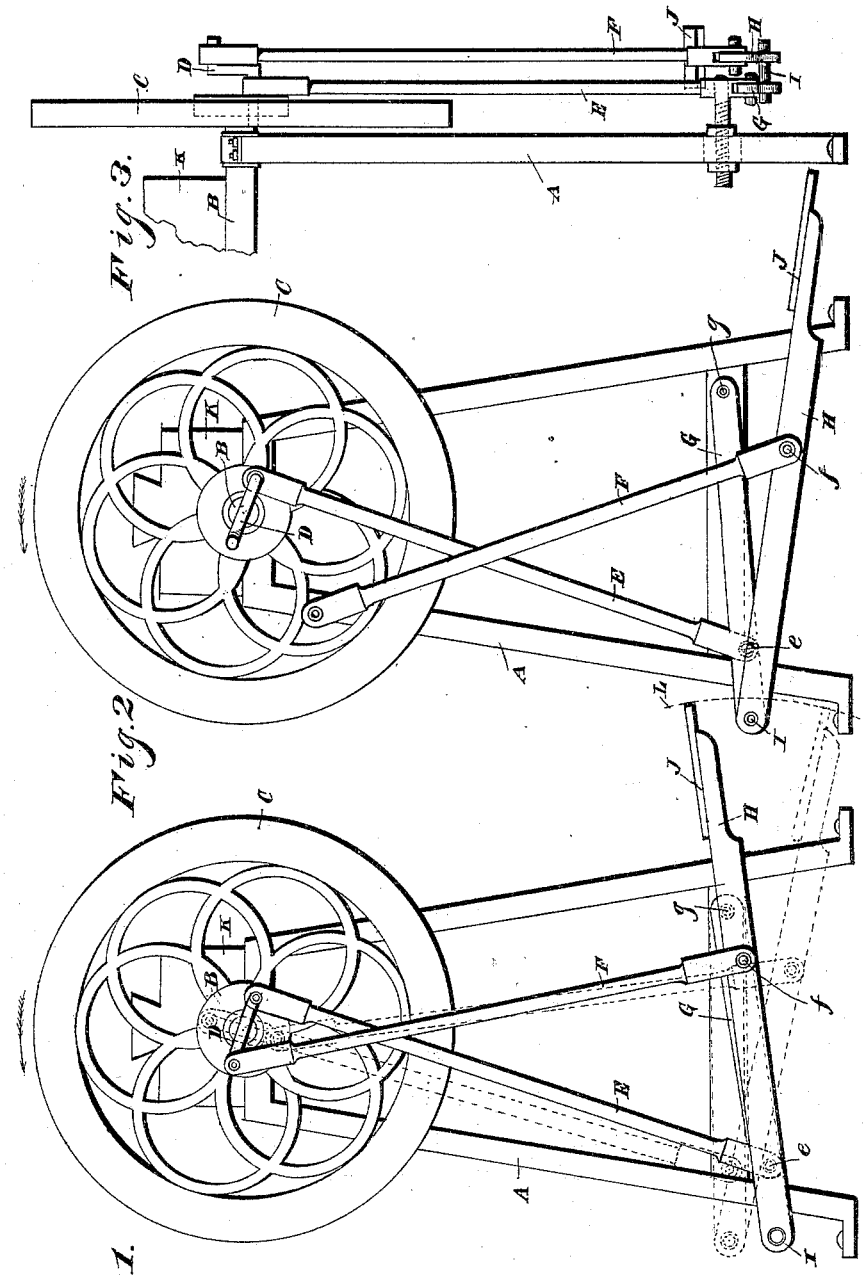
Witnesses,
Inventor
Charles E. Burrows
and Frank E. Jones,
By their Attorneys

UNITED STATES PATENT OFFICE.

CHARLES E. BURROWS AND FRANK E. JONES, OF MONTAGUE, MICHIGAN.

MOTOR.

SPECIFICATION forming part of Letters Patent No. 426,432, dated April 29, 1890.

Application filed December 23, 1889. Serial No. 334,664. (No model.)

*To all whom it may concern:*

Be it known that we, CHARLES E. BURROWS and FRANK E. JONES, citizens of the United States, residing at Montague, in the county of Muskegon and State of Michigan, have invented a new and useful Motor, of which the following is a specification.

The invention relates to improvements in motors, and has special reference to lever mechanism for operating grinding-mills, sewing-machines, scroll-saws, and similar machines; and it consists in certain novel features of construction hereinafter described and claimed.

In the drawings, Figures 1 and 2 are side views illustrating different positions of our device. Fig. 3 is an end view of the same.

In the accompanying drawings we have shown our improvements applied to a coffee-mill, (designated by the letter K,) and in the said drawings A designates the frame, and B the driving-shaft journaled upon the said frame. On one end of the driving-shaft we secure a fly-wheel C, to which we attach the double crank D. On the arms of this double crank we pivot the upper end of the pitmen E F, the lower ends of which are pivoted to the levers G H at *e f*, respectively. The inner lever G is pivoted to the frame A at its forward end *g*, and the two levers are pivoted together at their rear ends, as shown at I. The front end of the outer lever H projects beyond the frame A, and is provided with a foot-piece J.

In practice, when it is desired to operate the machine, the foot-piece is depressed, thereby carrying the front end of the lever H downward, so that the pitman F will be operated to rotate the double crank, and consequently cause the pitman E to raise the lever G. Upon the upstroke of the foot-piece the rear ends of the levers are depressed and the pitmen given the reverse motion, so that the double crank will be continuously operated. It will thus be seen that the driving-shaft will be rapidly rotated by the expenditure of a slight force and a continuous rotary motion imparted thereto by a vertical reciprocatory motion of the foot-piece. The labor required to operate our improved device is reduced to a minimum, as the pitmen are simultaneously operated to rotate the crank-shaft. It will be seen that as the rear pitman E rises its pivotal point *e* moves around the pivotal point *g* of the inner lever. At the same time the pitman F is descending and its pivotal point *f* must move around the pivotal point I between the levers. This pivotal point I, however, is rising, and when it reaches the position shown in dotted lines of Fig. 1 the pivotal point *f* will of course be somewhat to the rear of the relative position to the frame that it occupies when the foot-piece J is raised. From this construction it follows that the foot-piece J has a combined downward and inward motion approximately on the curved dotted line L, which motion not only gives greater power but is extremely easy for the operator.

Having thus described our invention, what we claim, and desire to secure by Letters Patent, is—

1. The combination, with a suitable support, of the driving-wheel mounted thereon, the double crank projecting from the driving-wheel, the lever G, having its front end pivoted to the frame, the lever H, having its front end provided with a foot-piece and its rear end pivoted to the rear end of the lever G, and the pitmen E F, having their upper ends mounted on the double crank and their lower ends pivoted to the levers G H, respectively, as specified.

2. The combination, with the support, the driving-wheel journaled therein, and the double crank carried by said driving-wheel, of the inner lever G, mounted on a stationary pivot *g* in the frame at its front end, the outer lever H, mounted at its rear end on a moving pivot I in the rear end of the lever G, its front end projecting loosely beyond the pivot *g* and carrying a foot-piece J, an inner pitman E, connecting one crank with the inner lever G at *e*, forward of the moving pivot I, and an outer pitman F, connecting the other crank with the outer lever H at *f*, in rear of the stationary pivot *g* of the inner lever, the whole operating substantially as described.

In testimony that we claim the foregoing as our own we have hereto affixed our signatures in presence of two witnesses.

CHARLES E. BURROWS.
FRANK E. JONES.

Witnesses:
MINNIE STRENG,
MARY STRENG.